United States Patent
Okuhata et al.

(10) Patent No.: US 12,062,172 B2
(45) Date of Patent: Aug. 13, 2024

(54) MEDICAL IMAGE PROCESSING APPARATUS AND MEDICAL IMAGE PROCESSING SYSTEM

(71) Applicant: CANON MEDICAL SYSTEMS CORPORATION, Otawara (JP)

(72) Inventors: Daigo Okuhata, Sakura (JP); Tatsuo Maeda, Nasushiobara (JP); Yosuke Okubo, Nasushiobara (JP); Kyoko Sato, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 325 days.

(21) Appl. No.: 17/506,097

(22) Filed: Oct. 20, 2021

(65) Prior Publication Data

US 2022/0122257 A1    Apr. 21, 2022

(30) Foreign Application Priority Data

Oct. 21, 2020  (JP) ................ 2020-176973

(51) Int. Cl.
*G06T 7/00*    (2017.01)

(52) U.S. Cl.
CPC .. *G06T 7/0014* (2013.01); *G06T 2207/20081* (2013.01); *G06T 2207/20084* (2013.01); *G06T 2207/30196* (2013.01)

(58) Field of Classification Search
CPC ......... G06T 7/0014; G06T 2207/20081; G06T 2207/20084; G06T 2207/30196
See application file for complete search history.

(56) References Cited

U.S. PATENT DOCUMENTS

| | | | |
|---|---|---|---|
| 7,783,096 B2* | 8/2010 | Chen | G06T 7/207 382/128 |
| 2019/0318474 A1 | 10/2019 | Han | |
| 2020/0138395 A1* | 5/2020 | Tsuchiya | A61B 6/5276 |
| 2020/0342593 A1* | 10/2020 | Honjo | A61B 8/5207 |

FOREIGN PATENT DOCUMENTS

| | | | |
|---|---|---|---|
| JP | 2020-065920 A | 4/2020 | |
| JP | 2020-099570 A | 7/2020 | |

OTHER PUBLICATIONS

Office Action issued May 7, 2024, in corresponding Japanese Patent Application No. 2020-176973, 2 pages.

* cited by examiner

*Primary Examiner* — John J Lee
(74) *Attorney, Agent, or Firm* — Oblon, McClelland, Maier & Neustadt, L.L.P.

(57) ABSTRACT

A medical image processing apparatus according to an embodiment is a medical image processing apparatus that generates image data to be used in a trained model trained with image data acquired by a second apparatus, from image data acquired by a first apparatus and that includes a first obtaining unit and a first generating unit. The first obtaining unit is configured to obtain first patient image data obtained by the first apparatus by imaging a patient. The first generating unit is configured to generate, by using a first generative model and from the first patient image data, intermediate image data in which a characteristic of first image data acquired by the first apparatus has been deleted and is configured to generate, by using a second generative model and from the intermediate image data, second patient image data having a characteristic of second image data acquired by the second apparatus.

10 Claims, 5 Drawing Sheets

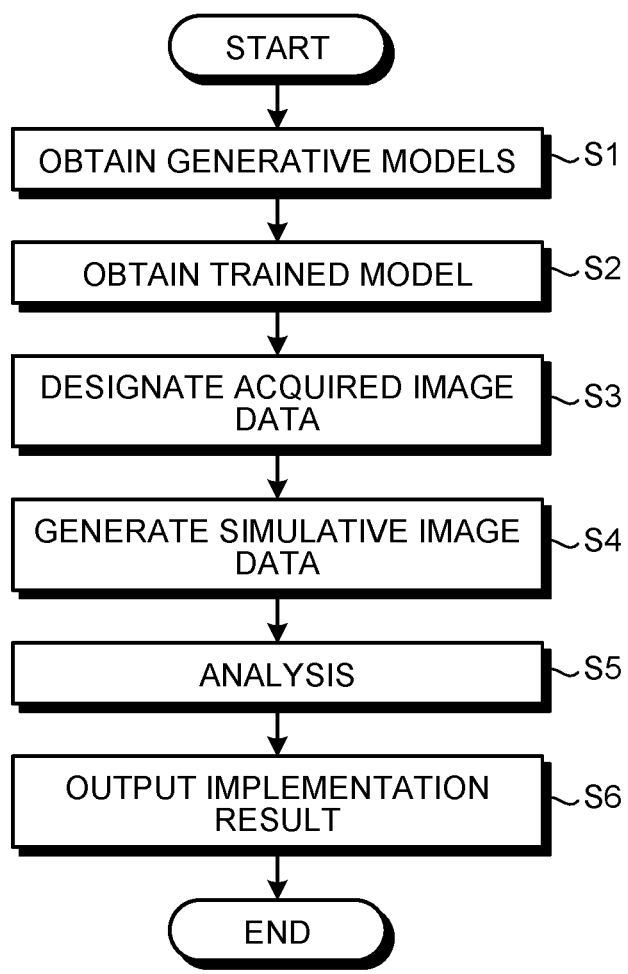

MEDICAL IMAGE PROCESSING APPARATUS AND MEDICAL IMAGE PROCESSING SYSTEM

CROSS-REFERENCE TO RELATED APPLICATIONS

This application is based upon and claims the benefit of priority from Japanese Patent Application No. 2020-176973, filed on Oct. 21, 2020; the entire contents of which are incorporated herein by reference.

FIELD

Embodiments described herein relate generally to a medical image processing apparatus and a medical image processing system.

BACKGROUND

One object of the embodiments disclosed in the present disclosure including the drawings is to make a trained model sharable. It should be noted, however, that possible objects of the embodiments disclosed in the present disclosure including the drawings are not limited to the above object. It is also possible to consider the objects corresponding to advantageous effects of the configurations described in the following embodiments as other objects.

BRIEF DESCRIPTION OF THE DRAWINGS

FIG. 8 is a flowchart illustrating an example of a provision implementation process performed by the medical image processing apparatus according to the present embodiment.

DETAILED DESCRIPTION

Figure 1:
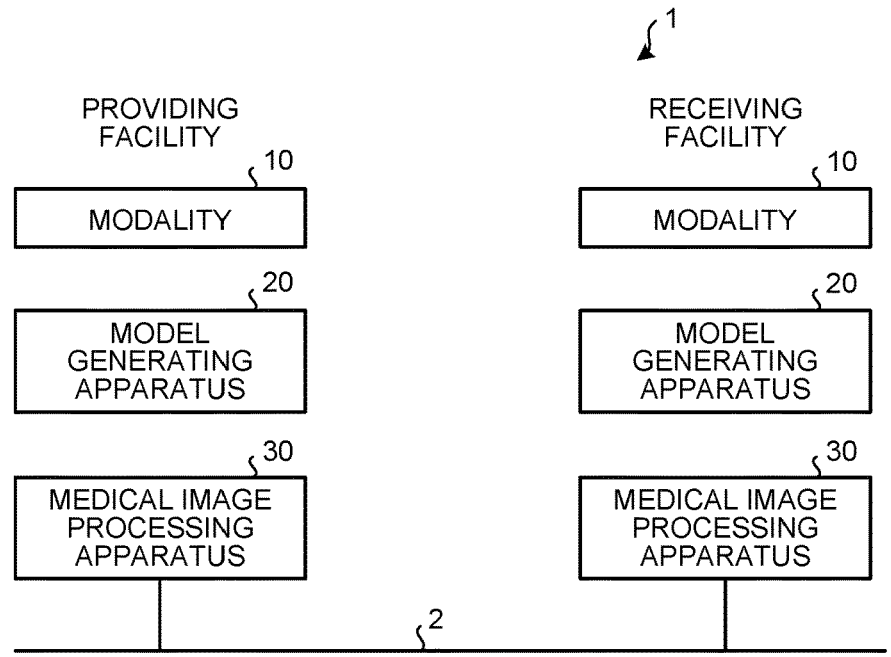
FIG. 1 is a block diagram illustrating an exemplary configuration of a model share system according to an embodiment of the present disclosure.

Exemplary embodiments of a medical image processing apparatus and a medical image processing system will be explained below, with reference to the accompanying drawings. In the following embodiments, some of the elements having mutually the same reference characters are assumed to perform mutually the same operations, and duplicate explanations thereof will be omitted as appropriate.

FIG. 1 is a block diagram illustrating an exemplary configuration of a model share system 1 according to an embodiment of the present disclosure. The model share system 1 is a system in which a trained model 246 (see FIG. 7) generated in a certain facility is made usable in another facility. In the model share system 1, a medical image processing apparatus 30 at a providing facility such as a hospital that provides the trained model 246 is communicably connected via a network 2 to another medical image processing apparatus 30 at a receiving facility that receives the provision of the trained model 246 from the providing facility. The model share system 1 is an example of a medical image processing system.

The providing facility has a modality 10 and a model generating apparatus 20. Further, the receiving facility has a modality 10 and a model generating apparatus 20. Although the providing facility and the receiving facility are connected to each other in the model share system 1 illustrated in FIG. 1, three or more facilities may be connected to one another. Further, each of the facilities may be provided with two or more modalities 10, two or more model generating apparatuses 20, and/or two or more medical image processing apparatuses 30.

The modalities 10 are each configured to generate image data by imaging an examined subject (hereinafter "patient"). For example, each of the modalities 10 may be an image diagnosis apparatus such as an X-ray Computed Tomography (CT) apparatus, a Magnetic Resonance Imaging (MRI) apparatus, an X-ray diagnosis apparatus, or an ultrasound diagnosis apparatus. Further, the modalities 10 are examples of the first apparatus and the second apparatus.

The modality 10 at the providing facility and the modality 10 at the receiving facility may be apparatuses of mutually the same type or may be apparatuses of mutually different types. For example, the modality 10 at the providing facility and the modality 10 at the receiving facility may both be X-ray CT apparatuses or may be an X-ray CT apparatus and an MRI apparatus. Further, when the modality 10 at the providing facility and the modality 10 at the receiving facility are apparatuses of mutually the same type, the manufacturers and/or the capabilities thereof are different from each other. For example, the modality 10 at the providing facility and the modality 10 at the receiving facility may both be X-ray CT apparatuses in which the number of rows of X-ray detecting elements are different from each other.

The model generating apparatuses 20 are each configured to generate a generative model. Each of the model generating apparatuses 20 is realized by using a computer device such as a personal computer or a server apparatus.

The medical image processing apparatuses 30 are each configured to generate image data by using any of the generative models generated by the model generating apparatuses 20. More specifically, the medical image processing apparatuses 30 are each configured to generate image data to be used in the trained model 246 trained with image data acquired by the second apparatus, from image data acquired by the first apparatus. For example, the medical image processing apparatuses 30 are each configured to generate the image data to be used in the trained model 246 trained with the image data acquired by the modality 10 at the providing facility, from the image data acquired by the modality 10 at the receiving facility. Further, the medical image processing apparatuses 30 are each configured to analyze the image data by using the trained model 246. Each of the medical image processing apparatuses 30 is realized by using a computer device such as a personal computer or a server apparatus. In the present example, the trained model 246 is represented by a technique for performing various types of processes such as a judging process and an estimating process. The trained model 246 is generated through machine learning such as reinforcement learning, supervised learning, unsupervised learning, deep learning, or the like. Possible learning methods are not limited to these examples, and the trained model 246 may be generated by using any other method.

An example will be explained in which, in the model share system 1 configured as described above, the trained model 246 at the providing facility is used with the image data acquired by the modality 10 at the receiving facility. Further, it is assumed that the trained model 246 at the providing facility has been generated through a learning process using the image data acquired by the modality 10 at the providing facility. The image data acquired by the modality 10 at the providing facility is different from the image data acquired by the modality 10 at the receiving facility in characteristics of the image data. In the present example, the characteristics of the image data include: noise contained in the image data, a degree of clarity indicating clarity of boundaries, CT values, and/or the like.

As explained above, because the characteristics of the image data such as noise are different, when the trained model 246 at the providing facility is employed to analyze the image data acquired by the modality 10 at the receiving facility, it may not be possible to achieve an expected precision level of analysis in some situations. To cope with these situations, there is an idea that it may be possible to prevent the precision level of analysis from being degraded, by generating a trained model 246 in common to be shared by the plurality of facilities. However, according to this method, an administrator or the like would need to take personal information serving as learning-purpose data to the outside of the facilities, in order to generate the trained model 246. Accordingly, the administrator or the like would need to carry out various types of procedures for taking the personal information to the outside and to take measures against information leakage, which would be cumbersome. In view of these circumstances, the medical image processing apparatus 30 is configured to generate the image data having characteristics of the image data acquired by the modality 10 at the providing facility, from the image data acquired by the modality 10 at the receiving facility.

More specifically, the medical image processing apparatus 30 is configured to generate intermediate image data having characteristics of reference image data, from the image data acquired by the modality 10 at the receiving facility. In this situation, the reference image data is image data having characteristics that are in common to the pieces of image data acquired by the modalities 10 in the model share system 1. In other words, the reference image data is image data having neither the characteristics of first image data acquired by the modality 10 at the receiving facility nor the characteristics of second image data acquired by the modality 10 at the providing facility. That is to say, the reference image data is image data that does not contain noise, which serves as an example of the characteristics, and the like. For example, the reference image data may be image data acquired with a high radiation dose or image data obtained by eliminating noise or the like through an image processing process. Further, for example, the reference image data may be image data of an evaluation-purpose phantom used for evaluating capabilities of an apparatus used in the imaging. Further, in the model share system 1, the reference image data is the single piece of image data to be shared between the facilities. Further, when the trained model 246 is to analyze a specific organ, the evaluation-purpose phantom may be an imitation of the target organ. In that situation, because the reference image data serves as image data of the target organ, the precision level of the analysis performed by the trained model 246 may further be enhanced in some situations.

Further, the intermediate image data is image data simulatively reproducing the characteristics of the reference image data, in the image data acquired by the modality 10. In other words, the intermediate image data is image data in which the characteristics such as noise have been deleted from the image data. The medical image processing apparatus 30 is configured to generate the intermediate image data from the image data acquired by the modality 10 at the receiving facility. In this manner, the medical image processing apparatus 30 has generated the image data in which the characteristics of the image data acquired by the modality 10 at the receiving facility have been deleted.

Further, the medical image processing apparatus 30 is configured to generate, from the intermediate image data, simulatively-acquired image data having the characteristics of the image data acquired by the modality 10 at the providing facility. The simulatively-acquired image data is image data simulatively reproducing, in the intermediate image data, the characteristics of the image data acquired by the modality 10 at the providing facility. In other words, the simulatively-acquired image data is image data obtained by adding the characteristics such as noise, to the intermediate image data. The medical image processing apparatus 30 is configured to generate the simulatively-acquired image data having the characteristics of the image data such as the noise, the degree of clarity indicating the clarity of the boundaries, and/or the like. In this manner, the medical image processing apparatus 30 has generated the simulatively-acquired image data obtained by adding the characteristics of the image data acquired by the modality 10 at the providing facility to the intermediate image data.

As a result of the processes described above, the medical image processing apparatus 30 has generated the simulatively-acquired image data that does not have the characteristics of the image data acquired by the modality 10 at the receiving facility, but has the characteristics of the image data acquired by the modality 10 at the providing facility. In other words, the medical image processing apparatus 30 has generated the simulatively-acquired image data reproducing the image data acquired by the modality 10 at the providing facility. Accordingly, when causing the trained model 246 at the providing facility to analyze the simulatively-acquired image data, the medical image processing apparatus 30 is able to prevent the precision level of the analysis from being degraded.

Next, a configuration of the model generating apparatuses 20 according to the present embodiment will be explained.

Figure 2:
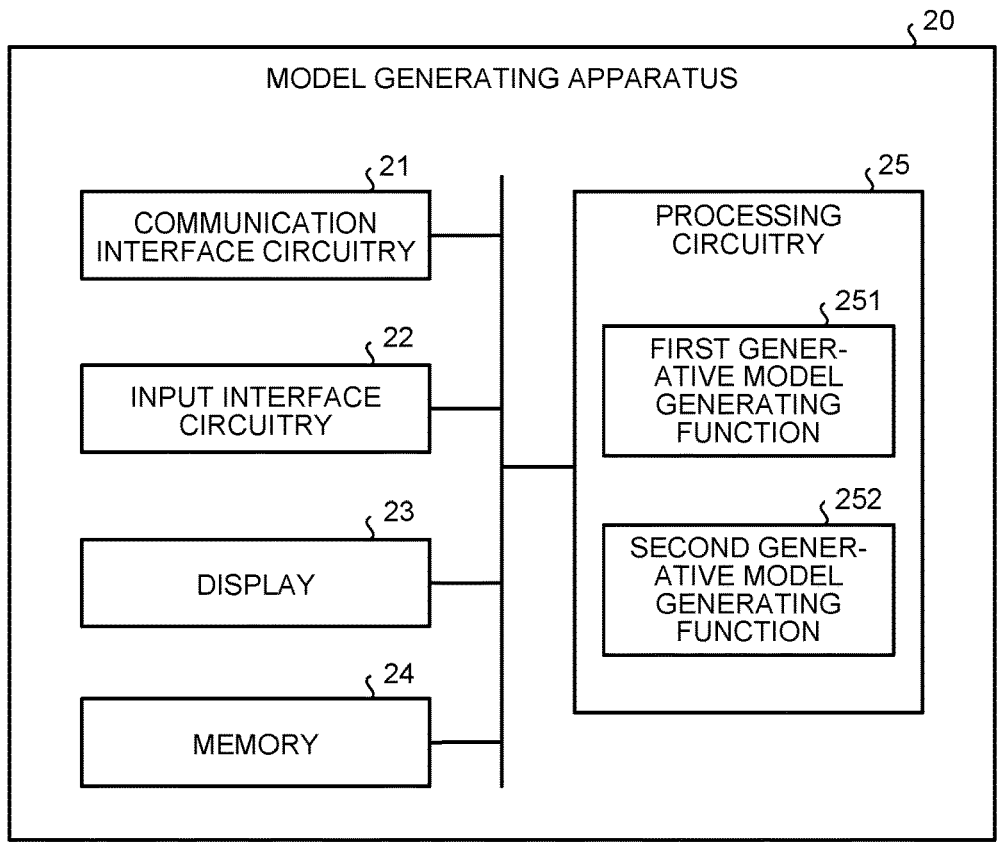
FIG. 2 is a block diagram illustrating an exemplary configuration of model generating apparatuses according to the present embodiment.

FIG. 2 is a block diagram illustrating an exemplary configuration of the model generating apparatuses 20 according to the present embodiment. Each of the model generating apparatuses 20 includes a communication interface circuitry 21, an input interface circuitry 22, a display 23, a memory 24, and a processing circuitry 25.

The communication interface circuitry 21 is connected to the processing circuitry 25 and is configured to control transfer of various types of data to and from, and communication with, apparatuses and devices connected via the network 2. For example, the communication interface circuitry 21 is realized by using a network card, a network adaptor, or a Network Interface Controller (NIC).

The input interface circuitry 22 is connected to the processing circuitry 25 and is configured to convert an input operation received from an operator (a medical worker) into an electrical signal and to output the electrical signal to the processing circuitry 25. More specifically, the input interface circuitry 22 is configured to convert the input operation received from the operator into the electrical signal and to output the electrical signal to the processing circuitry 25. For example, the input interface circuitry 22 is realized by using a trackball, a switch button, a mouse, a keyboard, a touchpad on which an input operation can be performed by touching an operation surface thereof, a touch screen in which a display screen and a touchpad are integrally formed, a contactless input circuitry using an optical sensor, an audio input circuitry, and/or the like. In the present disclosure, the input interface circuitry 22 does not necessarily have to include physical operation component parts such as the mouse, the keyboard, and/or the like. For instance, possible examples of the input interface circuitry 22 include an electrical signal processing circuitry configured to receive an electrical signal corresponding to an input operation from an external input device provided separately from the apparatus and to output the received electrical signal to a controlling circuitry.

The display 23 is connected to the processing circuitry 25 and is configured to display various types of information and various types of image data output from the processing circuitry 25. For example, the display 23 is realized by using a liquid crystal display, a Cathode Ray Tube (CRT) display, an organic Electroluminescence (EL) display, a plasma display, a touch panel, or the like.

The memory 24 is connected to the processing circuitry 25 and is configured to store therein various types of data. Further, the memory 24 is configured to store therein various types of programs that realize various types of functions as being read and executed by the processing circuitry 25. For example, the memory 24 is realized by using a semiconductor memory element such as a Random Access Memory (RAM) or a flash memory, or a hard disk, an optical disk, or the like.

The processing circuitry 25 is configured to control operations of the entirety of the model generating apparatus 20. For example, the processing circuitry 25 includes a first generative model generating function 251 and a second generative model generating function 252. In an embodiment, the processing functions executed by the constituent elements, namely, the first generative model generating function 251 and the second generative model generating function 252 are stored in the memory 24 in the form of computer-executable programs. The processing circuitry 25 is a processor configured to realize the functions corresponding to the programs, by reading and executing the programs from the memory 24. In other words, the processing circuitry 25 that has read the programs has the functions illustrated within the processing circuitry 25 in FIG. 2.

Although FIG. 2 illustrates the example in which the single processor realizes the first generative model generating function 251 and the second generative model generating function 252, it is also acceptable to structure the processing circuitry 25 by combining together a plurality of independent processors, so as to realize the functions as a result of the processors executing the programs. Further, although FIG. 2 illustrates the example in which the single memory such as the memory 24 stores therein the programs corresponding to the processing functions, it is also acceptable to provide a plurality of memory in a distributed manner, so that the processing circuitry 25 reads a corresponding program from each of the individual memory.

The first generative model generating function 251 is configured to generate, by using Generative Adversarial Networks (GANs), a first generative model 241 used for generating the intermediate image data having the characteristics of the reference image data from the image data acquired by the modality 10 at the receiving facility. In this situation, the intermediate image data is image data simulatively reproducing the characteristics of the reference image data, in the image data acquired by the modality 10. In other words, the intermediate image data is image data in which the characteristics such as noise have been deleted.

The first generative model generating function 251 is configured to generate the first generative model 241 by using the generative adversarial networks, with the use of first acquired image data acquired by the first apparatus and the reference image data having neither the characteristics of the first acquired image data nor the characteristics of second acquired image data acquired by the second apparatus. For example, the first generative model 241 is generated by using the generative adversarial networks, with the use of the first image data acquired by the modality 10 at the receiving facility and the reference image data having neither the characteristics of the first image data acquired by the modality 10 at the receiving facility nor the characteristics of the second image data acquired by the modality 10 at the providing facility. The first generative model generating function 251 is an example of a first model generating unit.

Figure 3:
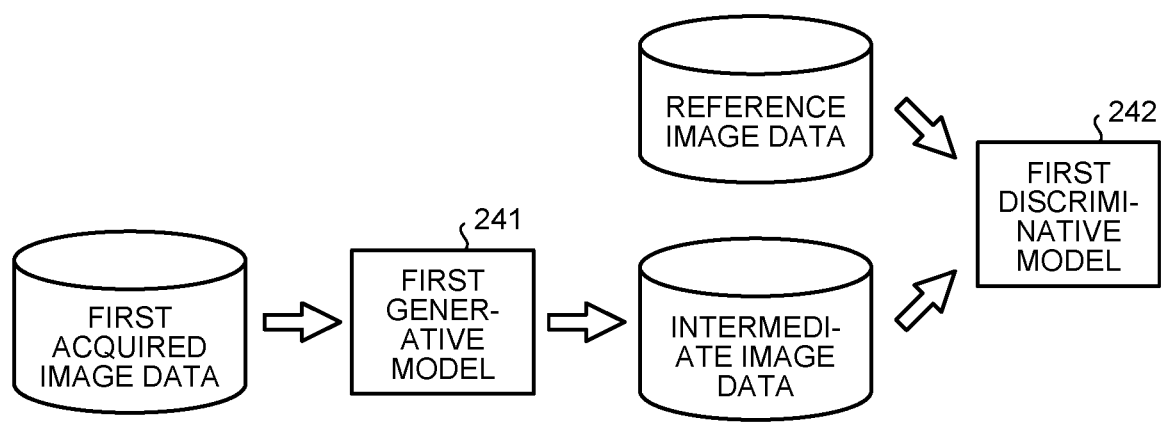
FIG. 3 is a drawing illustrating an example of a method for generating a first generative model implemented by generative adversarial networks.

FIG. 3 is a drawing illustrating an example of a method for generating the first generative model 241 implemented by the generative adversarial networks. The first generative model 241 is a generator in the generative adversarial networks. In other words, the first generative model 241 is a neural network configured to generate the intermediate image data from the image data acquired by the modality 10 at the receiving facility. A first discriminative model 242 is a discriminator in the generative adversarial networks. In other words, the first discriminative model 242 is a neural network configured to discriminate so as to determine which is the real reference image data, between the reference image data and the intermediate image data.

During a learning process, the first generative model generating function 251 inputs the first acquired image data acquired by the modality 10 to the first generative model 241. The first acquired image data is image data acquired by the first apparatus such as the modality 10 by imaging the evaluation-purpose phantom used for evaluating capabilities. The first acquired image data is an example of the first image data. The first generative model 241 generates the intermediate image data from the first acquired image data. The first discriminative model 242 discriminates so as to determine which is the real reference image data, between the reference image data and the intermediate image data.

When the first discriminative model 242 determines that the reference image data is the real reference image data, the first generative model generating function 251 updates a parameter of the neural network of the first generative model 241. The first generative model 241 generates intermediate image data by using the updated parameter. Further, the first discriminative model 242 discriminates so as to determine which is the real reference image data between the reference image data and the intermediate image data. The first generative model generating function 251 repeatedly performs the process until the precision level of the discrimination by the first discriminative model 242 to discriminate the real reference image data becomes equal to or lower than a threshold value. In this manner the first generative model generating function 251 has generated the first generative model 241.

The second generative model generating function 252 is configured to generate, by using generative adversarial networks, a second generative model 243 used for generating the simulatively-acquired image data having the characteristics of the image data acquired by the modality 10 at the providing facility, from the reference image data. In this situation, the simulatively-acquired image data is image data simulatively reproducing, in the image data, the characteristics of the image data acquired by the modality 10 at the providing facility. In other words, the simulatively-acquired image data is image data obtained by adding the characteristics such as noise.

More specifically, by using the generative adversarial networks, the second generative model generating function 252 generates the second generative model 243 with the use of the reference image data having neither the characteristics of the first acquired image data nor the characteristics of the second acquired image data, and the second acquired image data. For example, the second generative model 243 is generated by using the generative adversarial networks, with the use of the reference image data having neither the characteristics of the first image data acquired by the modality 10 at the receiving facility nor the characteristics of the second image data acquired by the modality 10 at the providing facility, and the second image data acquired by the modality 10 at the providing facility. The second generative model generating function 252 is an example of a second model generating unit.

Figure 4:
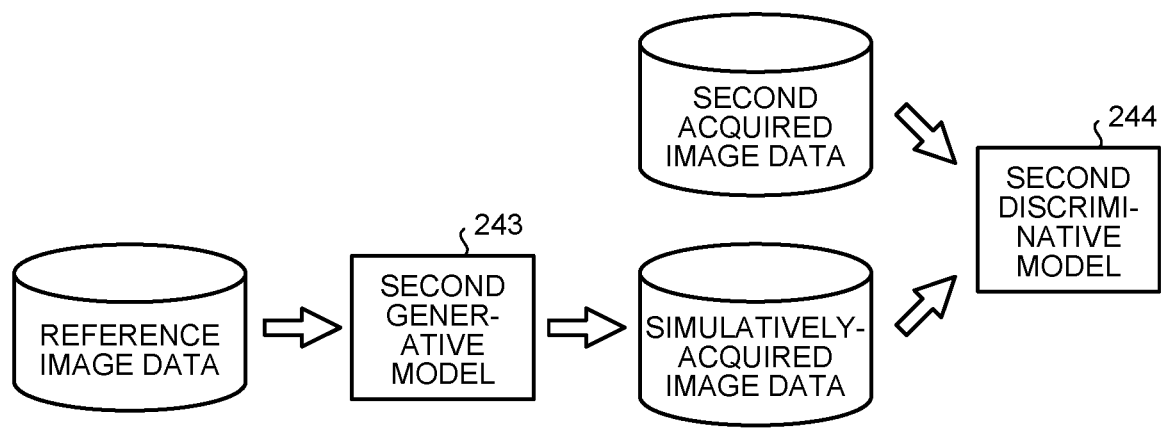
FIG. 4 is a drawing illustrating an example of a method for generating a second generative model implemented by the generative adversarial networks.

FIG. 4 is a drawing illustrating an example of a method for generating the second generative model 243 implemented by the generative adversarial networks. The second generative model 243 is a generator in the generative adversarial networks. In other words, the second generative model 243 is a neural network configured to generate the simulatively-acquired image data from the reference image data. A second discriminative model 244 is a discriminator in the generative adversarial networks. In other words, the second discriminative model 244 is a neural network configured to discriminate so as to determine which is the real image data acquired by the modality 10, between the image data acquired by the modality 10 at the providing facility and the simulatively-acquired image data.

During a learning process, the second generative model generating function 252 inputs the reference image data to the second generative model 243. The second generative model 243 generates simulatively-acquired image data from the reference image data. The second discriminative model 244 discriminates so as to determine, for example, which is the second acquired image data between the second acquired image data obtained by the modality 10 by imaging the evaluation-purpose phantom and the simulatively-acquired image data. The second acquired image data is image data obtained by the second apparatus such as the modality 10 by imaging the same evaluation-purpose phantom as the evaluation-purpose phantom used for the first acquired image data. In the present example, the simulatively-acquired image data at the time of the learning process is image data reproducing the image data obtained by the modality 10 by imaging the evaluation-purpose phantom. In other words, the second discriminative model 244 discriminates so as to determine which is the acquired image data acquired by the modality 10 at the providing facility, between the second acquired image data and the simulatively-acquired image data.

When the second discriminative model 244 determines that the second acquired image data is the real acquired image data, the second generative model generating function 252 updates a parameter of the neural network of the second generative model 243. The second generative model 243 generates simulatively-acquired image data by using the updated parameter. Further, the second discriminative model 244 discriminates so as to determine which is the real acquired image data between the second acquired image data and the simulatively-acquired image data. The second generative model generating function 252 repeatedly performs the process until the precision level of the discrimination by the second discriminative model 244 to discriminate the real acquired image data becomes equal to or lower than a threshold value. In this manner, the second generative model generating function 252 has generated the second generative model 243.

In the present example, when the trained model 246 is to analyze a specific organ, the evaluation-purpose phantom used for the first acquired image data and the second acquired image data may be a phantom imitating the target organ. In that situation, because the learning process is performed by using the image data of the phantom imitating the target organ, the precision level of the analysis performed by the trained model 246 may further be enhanced in some situations.

Next, a configuration of the medical image processing apparatuses 30 according to the present embodiment will be explained.

Figure 5:
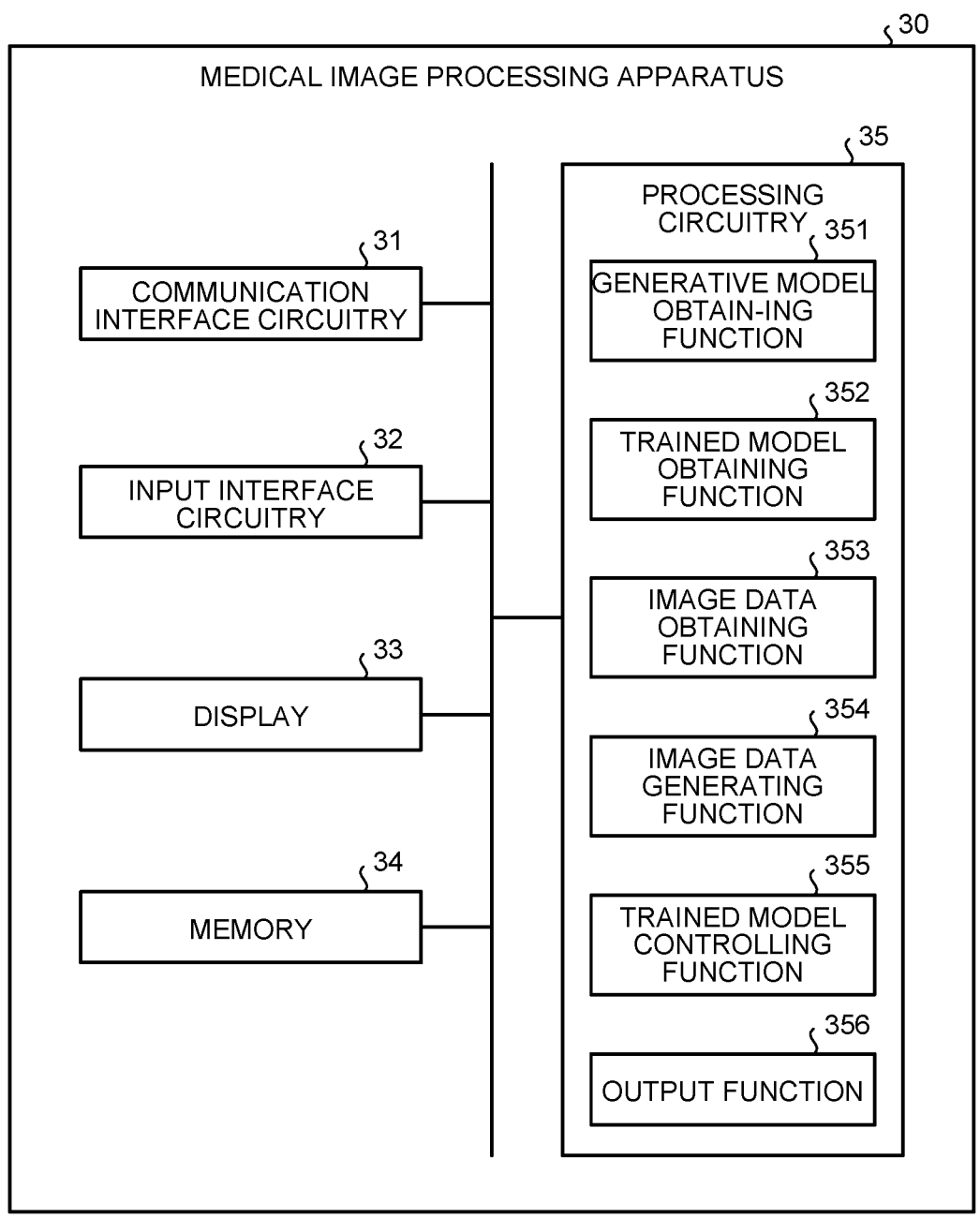
FIG. 5 is a block diagram illustrating an exemplary configuration of medical image processing apparatuses according to the present embodiment.

FIG. 5 is a block diagram illustrating an exemplary configuration of the medical image processing apparatuses 30 according to the present embodiment. Each of the medical image processing apparatuses 30 includes a communication interface circuitry 31, an input interface circuitry 32, a display 33, a memory 34, and a processing circuitry 35.

The communication interface circuitry 31 is connected to the processing circuitry 35 and is configured to control transfer of various types of data to and from, and communication with, apparatuses and devices connected via the network 2. For example, the communication interface circuitry 31 is realized by using a network card, a network adaptor, or an NIC.

The input interface circuitry 32 is connected to the processing circuitry 35 and is configured to convert an input operation received from an operator (a medical worker) into an electrical signal and to output the electrical signal to the processing circuitry 35. More specifically, the input interface circuitry 32 is configured to convert the input operation received from the operator into the electrical signal and to output the electrical signal to the processing circuitry 35. For example, the input interface circuitry 32 is realized by using a trackball, a switch button, a mouse, a keyboard, a touchpad on which an input operation can be performed by touching an operation surface thereof, a touch screen in which a display screen and a touchpad are integrally formed, a contactless input circuitry using an optical sensor, an audio input circuitry, and/or the like. In the present disclosure, the input interface circuitry 32 does not necessarily have to include physical operation component parts such as the mouse, the keyboard, and/or the like. For instance, possible examples of the input interface circuitry 32 include an electrical signal processing circuitry configured to receive an electrical signal corresponding to an input operation from an external input device provided separately from the apparatus and to output the received electrical signal to a controlling circuitry.

The display 33 is connected to the processing circuitry 35 and is configured to display various types of information and various types of image data output from the processing circuitry 35. For example, the display 33 is realized by using a liquid crystal display, a CRT display, an organic EL display, a plasma display, a touch panel, or the like.

The memory 34 is connected to the processing circuitry 35 and is configured to store therein various types of data. Further, the memory 34 is configured to store therein various types of programs that realize various types of functions as being read and executed by the processing circuitry 35. For example, the memory 34 is realized by using a semiconductor memory element such as a RAM or a flash memory, or a hard disk, an optical disk, or the like.

The processing circuitry 35 is configured to control operations of the entirety of the medical image processing apparatus 30. For example, the processing circuitry 35 includes a generative model obtaining function 351, a trained model obtaining function 352, an image data obtaining function 353, an image data generating function 354, a trained model controlling function 355, and an output function 356. In an embodiment, the processing functions executed by the constituent elements, namely, the generative model obtaining function 351, the trained model obtaining function 352, the image data obtaining function 353, the image data generating function 354, the trained model controlling function 355, and the output function 356 are stored in the memory 34 in the form of computer-executable programs. The processing circuitry 35 is a processor configured to realize the functions corresponding to the programs, by reading and executing the programs from the memory 34. In other words, the processing circuitry 35 that has read the programs has the functions illustrated within the processing circuitry 35 in FIG. 5.

Although FIG. 5 illustrates the example in which the single processor realizes the generative model obtaining function 351, the trained model obtaining function 352, the image data obtaining function 353, the image data generating function 354, the trained model controlling function 355, and the output function 356, it is also acceptable to structure the processing circuitry 35 by combining together a plurality of independent processors, so as to realize the functions as a result of the processors executing the programs. Further, although FIG. 5 illustrates the example in which the single memory such as the memory 34 stores therein the programs corresponding to the processing functions, it is also acceptable to provide a plurality of memory in a distributed manner, so that the processing circuitry 35 reads a corresponding program from each of the individual memory.

The term "processor" used in the above description denotes, for example, a Central Processing Unit (CPU), a Graphical Processing Unit (GPU), or a circuitry such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). The processors are each configured to realize the functions by reading and executing the programs saved in the memory 24 (34). Alternatively, instead of having the programs saved in the memory 24 (34), it is also acceptable to directly incorporate the programs in the circuitry of the processors. In that situation, the processors each realize the functions by reading and executing the programs incorporated in the circuitry thereof.

The generative model obtaining function 351 is configured to obtain the first generative model 241 and the second generative model 243. More specifically, the generative model obtaining function 351 is configured to obtain the first generative model 241 from the model generating apparatus 20 at the receiving facility. Further, the generative model obtaining function 351 is configured to obtain the second generative model 243 from the model generating apparatus 20 at the providing facility.

The trained model obtaining function 352 is configured to obtain the trained model 246 from the providing facility. The trained model obtaining function 352 is an example of a second obtaining unit.

The image data obtaining function 353 is configured to obtain first patient image data obtained by the first apparatus by imaging the patient. In this situation, the first apparatus is the modality 10 at the receiving facility, for example. More specifically, the first apparatus is the modality 10 that acquired the image data serving as a processing target of the trained model 246 being provided. Further, the image data obtaining function 353 is an example of the first obtaining unit. For example, when the medical image processing apparatus 30 at the providing facility illustrated in FIG. 1 is to perform an analyzing process by using the trained model 246 at the receiving facility, the image data obtaining function 353 is configured to obtain the image data acquired by the modality 10 at the providing facility by imaging the patient.

The image data generating function 354 is configured to generate second patient image data from the first patient image data by using a conversion model 245. In other words, by using the first generative model 241 and from the first patient image data, the image data generating function 354 is configured to generate the intermediate image data in which the characteristics of the first image data acquired by the first apparatus have been deleted and is configured to generate, by using the first generative model 241 and from the intermediate image data, the second patient image data having the characteristics of the second image data acquired by the second apparatus. In this situation, the second apparatus is the modality 10 at the providing facility. More specifically, the second apparatus is the modality 10 that acquired the image data used in the learning process of the trained model 246. Further, the image data generating function 354 is an example of the first generating unit.

Figure 6:
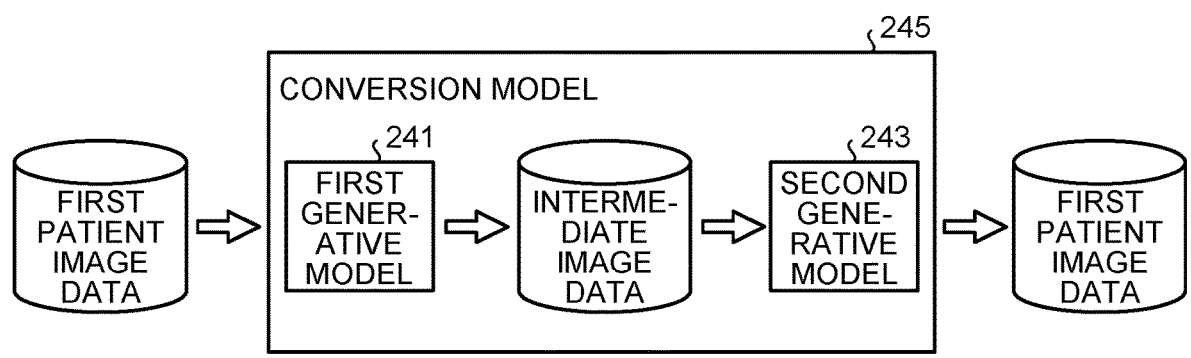
FIG. 6 is a block diagram illustrating an exemplary configuration of a conversion model.

In relation to the above, FIG. 6 is a block diagram illustrating an exemplary configuration of the conversion model 245. The conversion model 245 includes the first generative model 241 and the second generative model 243. When the first patient image data is input thereto as acquired image data to be converted, the conversion model 245 is configured to generate intermediate image data from the first patient image data by using the first generative model 241. Further, by using the second generative model 243 and from the intermediate image data, the conversion model 245 is configured to generate the second patient image data as simulatively-acquired image data. In other words, the conversion model 245 is configured to generate the intermediate image data in which the characteristics such as noise contained in the acquired image data have been deleted and is configured to generate the second patient image data obtained by adding the characteristics such as noise to the intermediate image data.

The trained model controlling function 355 is configured to control the analyzing process performed by the trained model 246. For example, the trained model controlling function 355 is configured to cause the trained model 246 obtained by the trained model obtaining function 352 to analyze the second patient image data. The trained model controlling function 355 is an example of an analysis controlling unit.

Figure 7:
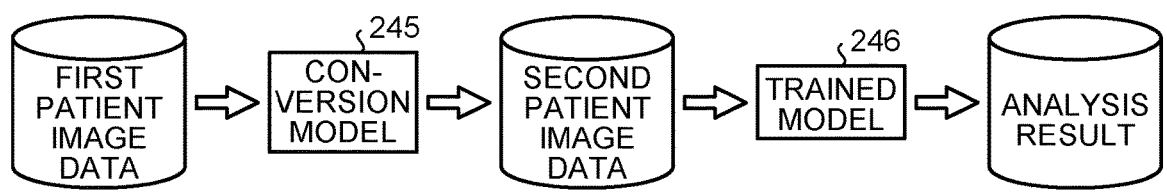
FIG. 7 is a drawing illustrating an example of a process up to implementation of an analyzing process by a trained model.

FIG. 7 is a drawing illustrating an example of a process up to the implementation of the analyzing process by the trained model 246. The image data generating function 354 designates the first patient image data acquired by the modality 10 by imaging the patient, as acquired image data to be converted by the conversion model 245. From the first patient image data, the conversion model 245 generates the second patient image data, as the simulatively-acquired image data. The trained model controlling function 355 designates the second patient image data generated by the conversion model 245 as data to be analyzed by the trained model 246. The trained model 246 performs the analyzing process on the designated second patient image data.

The output function 356 is configured to output a result of the implementation of the analyzing process by the trained model 246. In this situation, the output function 356 may output the result of the implementation on the second patient image data without performing any processing thereon, may output the implementation result after converting the data back to first patient image data, or may output the implementation result superimposed on the first patient image data.

In this situation, the trained model 246 is configured to perform the analyzing process on the second patient image data reproducing the image data acquired by the modality 10 at the other facility. Accordingly, when the output function 356 outputs the implementation result without performing any processing thereon, a medical worker who interprets the implementation result will need to interpret the second patient image data, which seems unfamiliar. To cope with this situation, the output function 356 is configured to convert the second patient image data including the implementation result of the analyzing process into the first patient image data including the implementation result of the analyzing process. After that, the output function 356 outputs the first patient image data including the implementation result of the analyzing process.

In another example, when the trained model 246 performs an analyzing process to detect the position of a lesion from the second patient image data, the output function 356 is configured to generate image data in which an implementation result indicating the detected position of the lesion is superimposed on the first patient image data. Further, the output function 356 may be configured to output the generated image data, by having the data displayed.

Next, a provision implementation process performed by the medical image processing apparatus 30 will be explained. The provision implementation process is a process of implementing the provided trained model 246. FIG. 8 is a flowchart illustrating an example of the provision implementation process performed by the medical image processing apparatus 30 according to the present embodiment.

The generative model obtaining function 351 obtains the first generative model 241 and the second generative model 243 (step S1).

The trained model obtaining function 352 obtains the trained model 246 (step S2).

The image data generating function 354 designates the first patient image data, as data to be converted by the conversion model 245 including the first generative model 241 and the second generative model 243 (step S3). In other words, the image data generating function 354 designates the first patient image data, as the data which the trained model 246 is to be instructed to analyze.

The image data generating function 354 causes the conversion model 245 to generate the second patient image data from the first patient image data (step S4).

The trained model controlling function 355 causes the trained model 246 obtained by the trained model obtaining function 352 to analyze the second patient image data (step S5).

The output function 356 outputs a result of the analysis performed on the second patient image data by the trained model 246 (step S6).

Thus, the medical image processing apparatus 30 ends the provision implementation process.

As explained above, the medical image processing apparatus 30 according to the present embodiment obtains: the first generative model 241 configured to generate, from the image data acquired by the one modality 10, the intermediate image data in which the characteristics such as noise of the image data have been deleted; and the second generative model 243 configured to generate, from the intermediate image data, the image data having the characteristics such as noise as the characteristics of the image data acquired by the other modality 10. Further, the medical image processing apparatus 30 is configured to generate the second patient image data having the characteristics of the image data acquired by the other modality 10, by inputting the first patient image data acquired by the one modality 10 to the first generative model 241. Accordingly, the medical image processing apparatus 30 is able to generate the image data suitable for the trained model 246. Consequently, the medical image processing apparatus 30 is able to make the trained model 246 sharable.

In addition, in the model share system 1 according to the embodiment, because there is no need to newly generate the trained model 246, it is not necessary to take the personal information to the outside of the facilities as the learning-purpose data. Accordingly, the administrator of the system or the like does not need to carry out the various types of procedures or to take the measures against information leakage.

Further, in the above embodiment, the example was explained in which the first generative model 241 and the second generative model 243 are generated by the model generating apparatus 20. However, the first generative model 241 and the second generative model 243 may be generated by the medical image processing apparatus 30. In other words, the medical image processing apparatus 30 may include the first generative model generating function 251 and the second generative model generating function 252.

Further, in the above embodiment, the example was explained in which the medical image processing apparatus 30 at the receiving facility is configured to generate the second patient image data from the first patient image data. However, the conversion model 245 may include by the medical image processing apparatus 30 owned by a third party that provides a service of generating the conversion model 245 and generating the second patient image data. Further, the medical image processing apparatus 30 owned by the third party may generate the second patient image data from the first patient image data.

Furthermore, in the above embodiment, the example was explained in which the model generating apparatus 20 is configured to generate the first generative model 241 and the second generative model 243 by using the image data of the evaluation-purpose phantom; however, the model generating apparatus 20 may be configured to generate the first generative model 241 and the second generative model 243 by using image data of a human body such as that of the patient.

In other words, the model generating apparatus 20 may be configured to generate the first generative model 241 by using the first acquired image data being image data acquired by the first apparatus such as the modality 10 by imaging the human body. Further, the model generating apparatus 20 may be configured to generate the first generative model 241 by using the second acquired image data being image data acquired by the second apparatus such as the modality 10 by imaging the same human body as the human body imaged for the first acquired image data. Further, acquiring the image data by using an MRI apparatus is more desirable because the human body is not exposed to radiation, unlike during the imaging process using an apparatus that involves radiation exposure such as an X-ray CT apparatus.

Further, in the above embodiment, the example was explained in which the conversion model 245 is configured to generate the second patient image data from the first patient image data by generating the intermediate image data one time; however, the conversion model 245 may generate the intermediate image data multiple times. For example, the conversion model 245 may generate first intermediate image data from the first patient image data. After that, the conversion model 245 may generate second intermediate image data from the first intermediate image data. Subsequently, the conversion model 245 may generate the second patient image data from the second intermediate image data. In this manner, the conversion model 245 may generate the second patient image data from the first patient image data by generating the multiple pieces of intermediate image data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus that generates second subject image data to be used in a trained model trained with second image data acquired by a second apparatus, from first subject image data acquired by a first apparatus, the medical image processing apparatus comprising:
    processing circuitry configured to:
        obtain the first subject image data acquired by the first apparatus by imaging a subject;
        use a first trained model to generate intermediate image data by deleting, from the first subject image data, a characteristic of first image data acquired by the first apparatus; and
        use a second trained model to generate, from the intermediate image data, the second subject image data having a characteristic of the second image data acquired by the second apparatus.

2. The medical image processing apparatus according to claim 1, wherein the processing circuitry is further configured to generate the first trained model by using a generative adversarial network, based on the first image data and reference image data having neither the characteristic of the first image data nor the characteristic of the second image data.

3. The medical image processing apparatus according to claim 1, wherein the processing circuitry is further configured to generate the second trained model by using a generative adversarial network, based on reference image data having neither the characteristic of the first image data nor the characteristic of the second image data, and the second image data.

4. The medical image processing apparatus according to claim 1, wherein the processing circuitry is further configured to cause the trained model to analyze the second subject image data.

5. The medical image processing apparatus according to claim 4, wherein the processing circuitry is further configured to
    obtain the trained model, and
    cause the obtained trained model to analyze the second subject patient image data.

6. The medical image processing apparatus according to claim 1, wherein the processing circuitry is further configured to use the first trained model to generate the intermediate image data by deleting, from the first subject image data, the characteristic of the first image data acquired by the first apparatus by imaging an evaluation-purpose phantom used for evaluating a capability.

7. The medical image processing apparatus according to claim 6, wherein the processing circuitry is further configured to use the second trained model to generate, from the intermediate image data, the second subject image data having the characteristic of the second image data acquired by the second apparatus by imaging the evaluation-purpose phantom.

8. The medical image processing apparatus according to claim 1, wherein the processing circuitry is further configured to use the first trained model to generate the intermediate image data by deleting, from the first subject image data, the characteristic of the first image data acquired by the first apparatus by imaging a human body.

9. The medical image processing apparatus according to claim 8, wherein, as the second image data, the processing circuitry is further configured to use image data acquired by the second apparatus by imaging the human body.

10. A medical image processing system, comprising:
    a model generating apparatus that generates trained models; and
    a medical image processing apparatus that generates image data by using the trained models, wherein
    the model generating apparatus includes first processing circuitry configured to:
        generate a first trained model by using a generative adversarial network, based on first image data acquired by a first apparatus and reference image data having neither a characteristic of the first image data nor a characteristic of second image data acquired by a second apparatus; and
        generate a second trained model by using a generative adversarial network based on reference image data having neither the characteristic of the first image data nor the characteristic of the second image data, and the second image data, and
    the medical image processing apparatus includes second processing circuitry configured to:
        obtain first subject image data acquired by the first apparatus by imaging a subject; and
        use the first trained model to generate intermediate image data by deleting the characteristic of the first image data acquired by the first apparatus from the first subject image data; and use the second trained model to generate, from the intermediate image data, second subject image data having the characteristic of the second image data acquired by the second apparatus.

\* \* \* \* \*